(12) United States Patent
Luff et al.

(10) Patent No.: US 11,146,400 B2
(45) Date of Patent: *Oct. 12, 2021

(54) METHODS FOR VERIFYING DATA INTEGRITY

(71) Applicants: ARM IP Limited, Cambridge (GB); ARM Ltd, Cambridge (GB)

(72) Inventors: Geraint David Luff, Cambridge (GB); Brendan James Moran, Cambridge (GB); Milosch Meriac, Cambridge (GB); Manuel Pegourie-Gonnard, Paris (FR)

(73) Assignees: ARM IP LIMITED, Cambridge (GB); ARM LTD, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,233

(22) Filed: Mar. 16, 2020

(65) Prior Publication Data
US 2020/0288322 A1 Sep. 10, 2020

Related U.S. Application Data

(63) Continuation of application No. 15/258,117, filed on Sep. 7, 2016, now Pat. No. 10,595,207.

(30) Foreign Application Priority Data

Sep. 7, 2015 (GB) ...................................... 1515849

(51) Int. Cl.
*H04L 9/32* (2006.01)
*H04W 4/70* (2018.01)
(Continued)

(52) U.S. Cl.
CPC ............ *H04L 9/3239* (2013.01); *H04L 63/12* (2013.01); *H04W 4/70* (2018.02); *H04W 12/10* (2013.01);
(Continued)

(58) Field of Classification Search
CPC ..... H04L 9/3239; H04L 63/12; H04L 9/3247; H04W 4/005; H04W 12/10; H04W 4/80; H04W 4/008; H04W 4/02; H04W 4/06
(Continued)

(56) References Cited

U.S. PATENT DOCUMENTS 6,959,384 B1 * 10/2005 Serret-Avila ............ G06F 21/64
713/176
9,882,768 B1 * 1/2018 Chen ....................... H04L 67/06
(Continued)

FOREIGN PATENT DOCUMENTS

CN 101479944 A 7/2009
CN 102446250 A 5/2012
(Continued)

OTHER PUBLICATIONS

Long Chen; An Efficient Piecewise Hashing Method for Computer Forensics; IEEE:2008; p. 615-638.*
(Continued)

*Primary Examiner* — Monjur Rahim
(74) *Attorney, Agent, or Firm* — Patterson Thuente Pedersen, P.A.

(57) ABSTRACT

A method for verifying the integrity of data in a message by a data processing device, the message comprising a plurality of packets, the method comprising: receiving, at the device from a first resource, a manifest associated with the message, the manifest comprising a plurality of group check values for the plurality of packets; receiving, at the device, from the first or a different resource, the message; generating a first progression of rolling hashes for the plurality of packets; deriving group check values from the first progression of rolling hashes for groups of the plurality of packets along one or more paths; verifying the integrity of the data in the message based on or in response to a determination
(Continued)

that the derived group check values correspond to the plurality of group check values in the manifest.

18 Claims, 10 Drawing Sheets

(51) Int. Cl.
| | |
|---|---|
| H04L 29/06 | (2006.01) |
| H04W 12/10 | (2021.01) |
| H04W 12/12 | (2021.01) |
| H04W 12/102 | (2021.01) |
| H04W 12/106 | (2021.01) |
| H04W 12/122 | (2021.01) |
| H04W 4/80 | (2018.01) |
| H04W 4/06 | (2009.01) |

(52) U.S. Cl.
CPC ....... *H04W 12/102* (2021.01); *H04W 12/106* (2021.01); *H04W 12/12* (2013.01); *H04W 12/122* (2021.01); *H04L 9/3247* (2013.01); *H04W 4/06* (2013.01); *H04W 4/80* (2018.02)

(58) Field of Classification Search
USPC ......................................................... 713/168
See application file for complete search history.

(56) References Cited

U.S. PATENT DOCUMENTS

| | | | | |
|---|---|---|---|---|
| 10,229,132 B2* | 3/2019 | Aronovich | .......... | G06F 16/1748 |
| 10,595,207 B2 | 3/2020 | Luff et al. | | |
| 2003/0126400 A1* | 7/2003 | Debiez | ................. | H04L 9/3236 |
| | | | | 711/216 |
| 2005/0235154 A1* | 10/2005 | Serret-Avila | ........... | G06F 21/64 |
| | | | | 713/176 |
| 2009/0028192 A1* | 1/2009 | Rieger | .............. | H04N 21/6377 |
| | | | | 370/535 |
| 2009/0307251 A1* | 12/2009 | Heller | .................. | G06F 16/174 |
| 2010/0088512 A1* | 4/2010 | Schwartz | ............. | G06F 16/958 |
| | | | | 713/168 |
| 2010/0088517 A1* | 4/2010 | Piersol | ................. | H04L 9/3236 |
| | | | | 713/171 |
| 2010/0088551 A1* | 4/2010 | Berkner | ................. | G06Q 10/10 |
| | | | | 714/47.1 |
| 2010/0185847 A1* | 7/2010 | Shasha | .................... | G06F 21/54 |
| | | | | 713/150 |
| 2010/0220853 A1* | 9/2010 | Schneider | ............. | H04L 9/0643 |
| | | | | 380/29 |
| 2011/0061092 A1* | 3/2011 | Bailloeul | ................ | G06F 3/002 |
| | | | | 726/4 |
| 2011/0082836 A1* | 4/2011 | Wang | .................... | G06F 16/166 |
| | | | | 707/649 |
| 2011/0099351 A1* | 4/2011 | Condict | ............... | G06F 3/0608 |
| | | | | 711/216 |
| 2011/0238621 A1* | 9/2011 | Agrawal | ............... | G06F 16/273 |
| | | | | 707/610 |
| 2012/0233029 A1* | 9/2012 | Piersol | .................... | G06K 9/00 |
| | | | | 705/27.1 |
| 2013/0097692 A1* | 4/2013 | Cooper | .................. | G06F 21/00 |
| | | | | 726/14 |
| 2015/0381488 A1* | 12/2015 | Chanda | ................. | H04L 49/354 |
| | | | | 370/392 |

FOREIGN PATENT DOCUMENTS

| | | |
|---|---|---|
| WO | WO-2010024379 A1 | 3/2010 |
| WO | WO 2014/184857 A1 | 11/2014 |

OTHER PUBLICATIONS

Office Action dated Jun. 19, 2020 for Chinese Application No. 201610807668.6, 11 pages.
Combined Search and Examination Report for GB Application No. 1515849.6, dated Apr. 7, 2016, 8 pages.
Examination Report under Section 18(3) for GB Application No. 1515849.6, dated Dec. 4, 2018, 4 pages.
Jiang Z. L., et al., "k-Dimensional Hashing Scheme for Hard Disk Integrity Verification in Computer Forensics," Journal of Zhejing University—Science C (Computers & Electronics), Springer, 2011, vol. 12(10), pp. 809-818.
Application and File history for U.S. Appl. No. 15/258,117, filed Sep. 7, 2016. Inventors: Luff et al.
Office Action dated Mar. 29, 2021 for Chinese Application No. 201610807668.6, 14 pages.
Office Action dated Dec. 3, 2020 for Chinese Application No. 201610807668.6, 18 pages.

\* cited by examiner

METHODS FOR VERIFYING DATA INTEGRITY

RELATED APPLICATIONS

This application is a continuation of application Ser. No. 15/258,117 filed Sep. 7, 2016, which claims priority to GB Application No. 1515849.6 filed Sep. 7, 2015, each of which is hereby incorporated herein in its entirety by reference.

TECHNICAL FIELD

The present technique relates to the communication of data between data processing devices, and particularly, but not exclusively, to verifying the integrity of such data at a receiving device.

BACKGROUND

There are ever increasing numbers of data processing devices having processing and communication capabilities, which allows for interaction between such data processing devices, objects and cloud services, across different environments, as part of the 'Internet of Things' (IoT).

For example, a heating system in the home may gather information from various temperature sensor devices provided in a network (e.g. a mesh network) in the home and control the activation of heaters based on the gathered information; a factory pollution monitoring sensor device may gather information from various chemical sensors in a factory network and arrange maintenance via the internet based on the gathered information; a fridge may gather information from products within the fridge and update a user as to stock levels, best before dates and the like, for example, via the user's smartwatch or smartphone; while a door-lock device configured to lock/unlock doors may communicate with an authorized device, such as a smartphone paired therewith, to validate the authorized device and unlock one or more of the doors when the authorized device is in range thereof.

In IoT applications, such data processing devices, hereinafter 'IoT devices' may have minimal security capabilities such that they tend to be vulnerable to an attack by a $3^{rd}$ party. As an example, an attacker may, using a rogue device, intercept messages destined for the IoT device and modify/forge messages before transmitting the modified/forged messages to the IoT device so as to compromise the IoT device. Additionally or alternatively the attacker may transmit packets comprising corrupt data to an IoT device, which may result in failure of the IoT device.

Instead of attempting to intercept messages, an attacker may instead repeatedly send forged messages to the IoT devices, such that the IoT devices will attempt to process the forged messages such that the flash cycles at the IoT device will be exhausted or the battery drained, whereby the IoT device will not be capable of receiving further messages from genuine devices. Furthermore, an IoT device repeatedly receiving messages having packets with errors therein may repeatedly re-request updated messages from the transmitting device, thereby increasing congestion on the network.

SUMMARY

According to a first technique, there is provided a method for verifying the integrity of data in a message received by a data processing device, the message comprising a plurality of packets, the method comprising: receiving, at the device from a first resource, a manifest associated with the message, the manifest comprising a plurality of group check values for the plurality of packets; receiving, at the device, from the first or a different resource, the message; generating a first progression of rolling hashes for the plurality of packets; deriving group check values from the first progression of rolling hashes for groups of the plurality of packets along one or more paths; verifying the integrity of the data in the message based on or in response to a determination that the derived group check values correspond to the plurality of group check values in the manifest.

According to a second technique, there is provided a method for verifying the integrity of data in a portion of a message by a data processing device, the portion comprising a plurality of packets, the method comprising: receiving, at the device, from a first resource, the portion; generating a progression of rolling hashes for the plurality of packets; deriving group check values from the progression of rolling hashes for groups of the plurality of packets along a first path; deriving group check values from the progression of rolling hashes for groups of the plurality of packets along a second path; verifying the integrity of the data in the portion of the message based on or in response to a determination that one or more of the derived group check values for the groups along the first path corresponds to one or more of the derived group check values for the groups along the second path.

According to a third technique, there is provided a method of providing from a resource to one or more data processing devices, a data manifest for verifying the integrity of data in a plurality of packets of a message associated with the manifest, the method comprising: generating, at the resource, a first progression of rolling hashes; deriving, at the resource, check values for groups of the plurality of packets from the first progression of rolling hashes along one or more paths; providing, in the manifest, the check values for the groups in the manifest; providing, in the manifest, data identifying the groups; transmitting the manifest to the data processing device.

BRIEF DESCRIPTION OF THE DRAWINGS

The techniques are diagrammatically illustrated, by way of example, in the accompanying drawings, in which:

FIG. 3d schematically shows an example of a manifest document associated with the message of FIG. 3a;

FIG. 4a schematically shows the message of FIG. 3a;

FIG. 5a schematically shows four paths for the message of FIG. 3a;

DETAILED DESCRIPTION OF THE DRAWINGS

Figure 1:
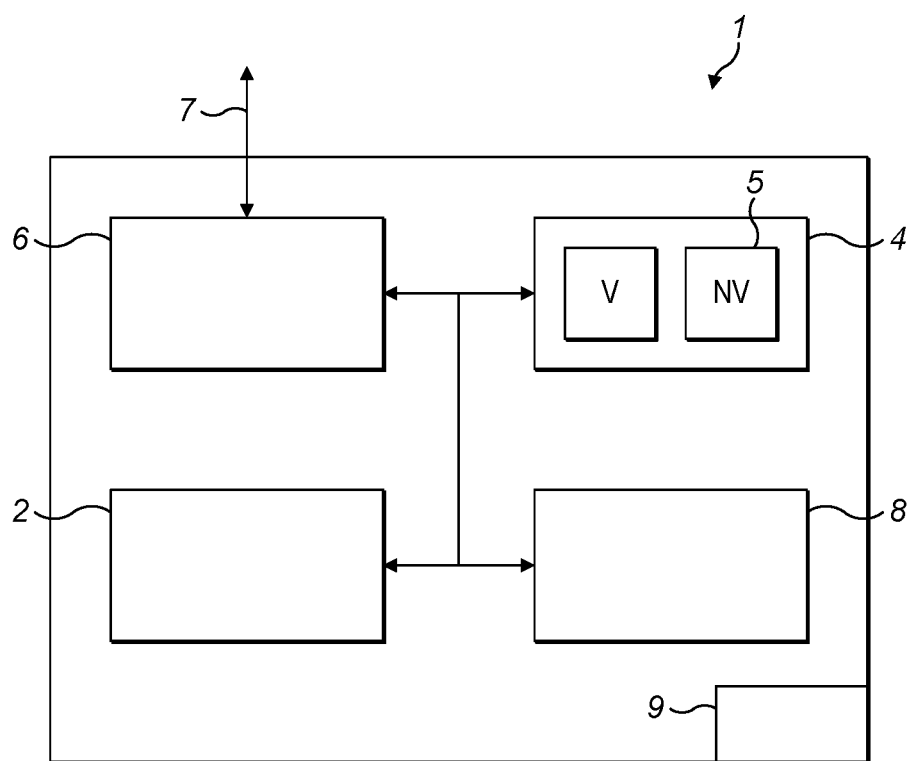
FIG. 1 schematically shows an example of an IoT device for use with the present techniques.

The circuitry of the IoT device 1 of FIG. 1 includes processing element 2 coupled to a storage element 4, communication circuitry 6 and input/output (I/O) circuitry 8.

The processing element 2 may comprise processing circuitry 2 provided to carry out instructions of a program by performing the arithmetic, logical, control and input/output (I/O) operations specified by the instructions.

The storage element 4 may comprise, for example, memory circuitry 4 having volatile (V) memory (e.g. RAM) and non-volatile (NV) memory 5 (e.g. flash or ROM). The memory circuitry 4 may store the programs executed by the processing element 2, as well as data such as credentials. Such credentials may include key material, for example, one or more cryptographic keys which correspond to one or more cryptographic keys provisioned on a remote device in communication therewith for authentication/encryption of communications sent therebetween.

For example, in symmetric key cryptography the key material may comprise identical keys which are used to encrypt/decrypt messages, while in asymmetric key cryptography (e.g. public key cryptography), the key material may comprise one or more public/private key pairs, whereby a device having a private key may decrypt messages encrypted using a corresponding public key, while the device having the private key may sign messages with the private key, whereby the signature can be verified by another device having the corresponding public key.

The communication circuitry 6 may be provided to communicate with remote devices (not shown in FIG. 1). The communication circuitry 6 may use wireless communication 7, such as, for example, wireless local area network (e.g. WiFi), short range communication such as radio frequency identification (RFID), near field communication (NFC), or communications used in wireless sensor networks such as ZigBee, Thread, Bluetooth and/or Bluetooth Low energy (BLE). Also the communication circuitry 6 may use a cellular network such as 3G or 4G. The communication circuitry 6 may also use wired communication (not shown) such as fibre optic or metal cable. The communication circuitry 6 could also use two or more different forms of communication, such as several of the examples given above in combination.

The input/output (I/O) circuitry 8 may comprise sensing circuitry to sense inputs from the surrounding environment and/or to provide an output to a user e.g. using a buzzer or light emitting diode(s) (not shown). The IoT device 1 may generate operational data based on the sensed inputs, whereby the operational data may be stored in the memory circuitry 4 and processed by the processor circuitry 2. The I/O circuitry 8 may also comprise a user interface (e.g. buttons) to allow the user to interact with the IoT device 1. Furthermore, the IoT device 1 may comprise a display e.g. an organic light emitting diode (OLED) display, for communicating messages to or receiving inputs from a user.

The IoT device 1 also comprises a power source 9. In FIG. 1, the power source is a battery (e.g. a lithium coin cell), although any suitable power source may be used (e.g. an AC or DC mains power supply; solar power, wind power etc.).

It will be appreciated that the IoT device 1 may comprise other hardware/software components not described herein depending on the specific functionality of the IoT device 1. For example, the IoT device 1 may be a fitness band having an embedded global positioning system (GPS) to capture and record movement of a user and to generate operational data accordingly.

Figure 2:
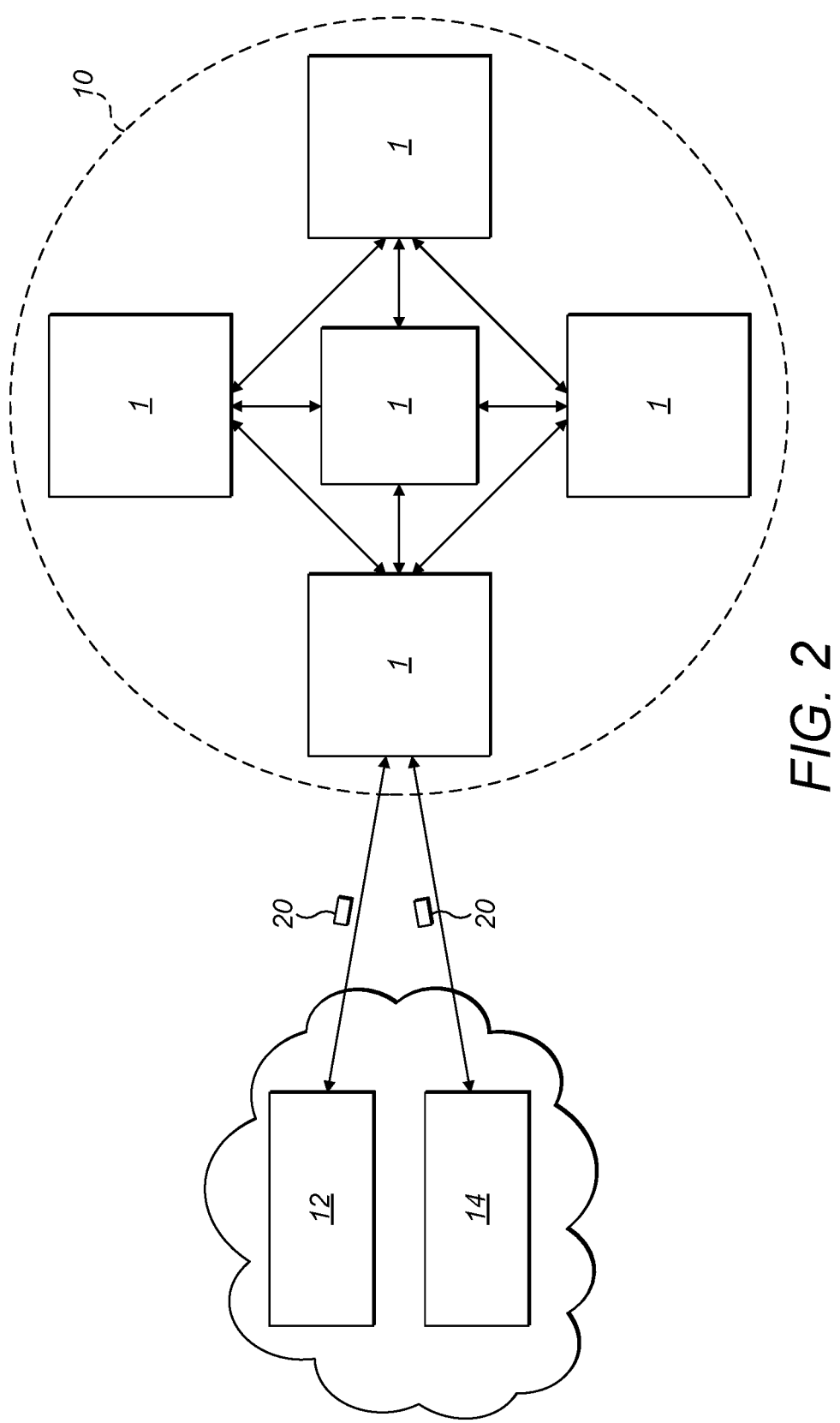
FIG. 2 schematically shows a plurality of data processing devices within wireless communication range of the IoT device of FIG. 1.

FIG. 2 schematically shows a plurality of IoT devices 1 in communication with each other in a network 10 (e.g. a mesh network, star network etc.), whereby the IoT devices 1 may communicate with each other using one or more suitable communications protocols, such as: BLE, Bluetooth, ZigBee, and whereby the IoT devices 1 may also communicate with other resources, whereby the other resources may be provided within the network 10 or may be provided in a different network (e.g. on the internet).

In FIG. 2, the resources 12 and 14 are depicted as cloud servers, whereby the IoT devices 1 are arranged in communication with resources 12/14, for the exchange of messages or portions thereof.

The cloud servers 12/14 may, for example, transmit messages 20 comprising firmware updates, applications, documents etc. to one or more of the IoT devices 1. In some examples, the messages 20 may be transmitted as broadcast communications to all IoT device 1 or may be transmitted to specific IoT devices 1 e.g. as unicast/multicast communications. Furthermore, an entire message may comprise one or more different portions sent from the different servers 12/14.

While depicted as cloud servers in FIG. 2, in alternative examples the resources may comprise any suitable resource capable of performing the techniques hereinafter described, such as a data processing device e.g. a smartphone, tablet etc.

It will be appreciated that other hardware/software not specifically described may be provided to enable such communication. Such hardware may include gateway devices, routers etc.

In order to demonstrate the integrity of the data in a message, a transmitting device may transform the entire message 20 using a suitable transformation function (e.g. SHA256, SHA512, CRC8, MD5, etc.) to generate a hash of the entire message 20.

A check value (e.g. check word, checksum) may be derived from the hash, whereby the message may then be transmitted with the derived check value concatenated thereto. To verify the integrity of the data in the received message, the receiving device may use the same transformation function to generate a hash of the received message, which may be used as a check value. If the generated check value corresponds to the received check value, then it can be taken that the data integrity in the message is not compromised (e.g. the data is unlikely to have been forged, corrupted or modified after transmission). If the check values do not match, then it can be taken that data integrity is compromised, whereby the receiving device can re-request transmission of the entire message.

In some cases, if the data payload in the message is too large to be sent as a single message, the message may be divided into smaller portions, whereby the portions are transmitted separately, with the check value concatenated to a portion of the message (e.g. the last portion to be transmitted).

It will be appreciated that increasing the length of the check value for the entire message may improve security insofar as a successful forging of the message will require an attacker to provide packets which provide the expected check value. Achieving such a check value which may be difficult to achieve for a large number of bits, for example when SHA256 or SHA512 are used to generate the hash. However, increasing the number of bits in a check value will result in an increase in the size of the data in the overall communication (entire message+check value), which may impact the transmission speed/number of communications in a network e.g. in networks having bandwidth restrictions.

Before verifying the integrity of the data in a message, a receiving device must wait until the entire message is received, because the receiving device can only generate a corresponding check value once the entire message is received.

Furthermore, such functionality may increase congestion in a network, whereby when a plurality of devices receive a message, undertake data integrity verification and identify an error and re-request transmission of the message substantially at the same time, then a resource will receive the plurality of re-requests at substantially the same time, and may become overloaded and fail. Furthermore, the network may not be capable of handling a large number of re-requests at substantially the same time and may also fail.

Figure 3A:
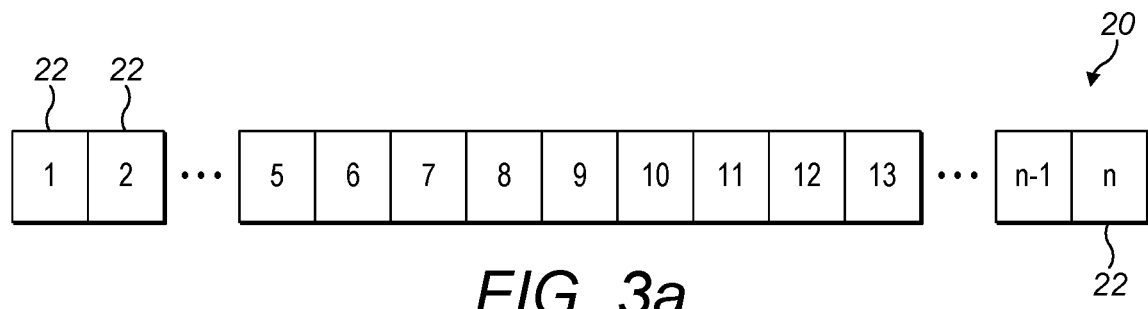
FIG. 3a schematically shows a message comprising 1-n data packets.
Figure 3B:
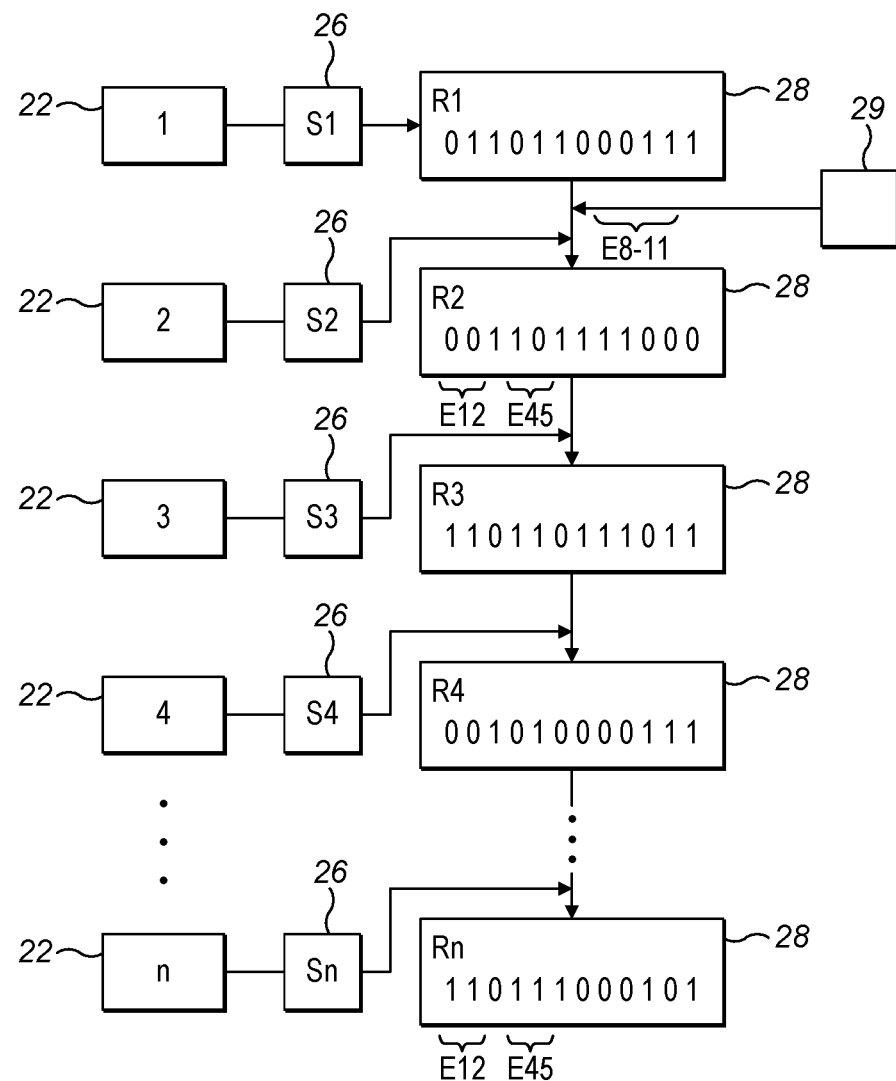
FIG. 3b schematically shows the generation of forward rolling hashes.
Figure 3C:
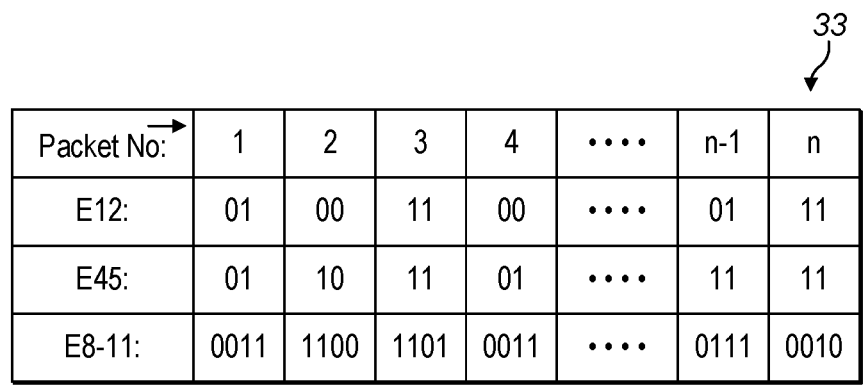
FIG. 3c schematically shows two different arrays of extract samples of the forward rolling hashes of FIG. 3b.
Figure 3D:
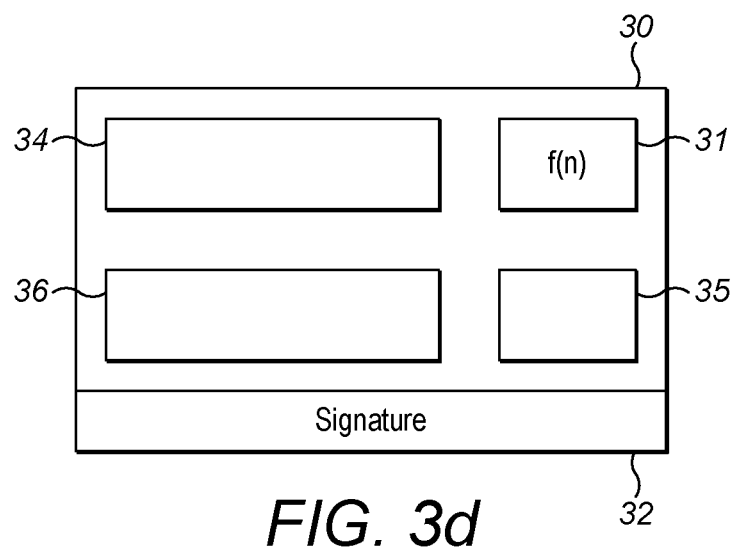

FIG. 3a schematically shows message 20, comprising (n) data packets 22. It will be appreciated that the message 20 may be firmware (e.g. a firmware update), program instructions, a text file, an image file, a sound file etc., or any other form of data, e.g. sensor data, whereby the packets 22 comprise data in the form of bits (not shown in FIG. 3a); FIG. 3b schematically shows the generation of rolling digests/hashes 28 hereinafter 'rolling hashes'; FIG. 3c schematically shows extract samples of the respective rolling hashes 28 arranged in an array 33, while FIG. 3d schematically shows an example of a data manifest 30, hereinafter 'manifest', associated with the message 20, whereby the manifest comprises data relating to the associated message. The manifest 30 may be generated by a transmitting device.

In the present example, each packet 22 of the message 20 is transformed using a suitable function to generate respective hashes 26 thereof. Such transformations may be undertaken using a suitable transformation function (e.g. SHA256, SHA512, CRC8, MD5, etc.). The hashes 26 of the respective packets 22 are hereinafter 'static hashes', whereby the value ($S_1$, $S_2$, $S_3$-$S_n$) of a particular static hash 26 is dependent on the characteristics of the packet 22 used to generate that particular static hash 26.

Furthermore, a progression or chain of rolling hashes 28 is generated, whereby the value of a particular rolling hash 28 in the progression is dependent on the characteristics of the rolling hashes of all preceding packets.

In the present example, the static hashes of consecutive packets in a notional forward direction from a first packet (Packet 1) to a last packet (Packet n) of the message 20 (hereinafter 'forward consecutive packets') are used to generate a progression of rolling hashes 28, hereinafter 'forward rolling hashes'.

Furthermore, secret data 29 may optionally be used to contribute to the generation of the rolling hashes, whereby the secret data 29 may, for example, be a random or pseudo-random number (e.g. a nonce) or key material.

In the schematic example of FIG. 3b, the first rolling hash ($R_1$) corresponds to the static hash ($S_1$) of the first packet.

The second rolling hash ($R_2$) corresponds to a combination of static hash ($S_2$), rolling hash ($R_1$) and secret data 29; while the third rolling hash ($R_3$) corresponds to a combination of the static hash ($S_3$) and rolling hash ($R_2$). Similarly, the final rolling hash ($R_n$), corresponds to a combination of the static hash ($S_e$) and rolling hash ($R_{n-1}$). In examples, the rolling hashes ($R_{1-n}$) are cumulative such that the final rolling hash ($R_n$) preferably corresponds to the hash of the entire message 20.

In FIG. 3b the secret data 29 is depicted as being combined with $R_1$ and $S_1$ to generate $R_2$. However, the secret data 29 may be used to generate any rolling hash either directly or indirectly. For example, when used to generate a rolling hash directly, the secret data 29 may be combined with a rolling hash to generate a subsequent rolling hash.

When used to generate a rolling hash indirectly, the secret data 29 may be combined with one or more of the packets and/or with one or more static hashes (when present), the result of the combination being used to generate a rolling hash for a packet.

While static hashes may improve security by increasing the difficulty for an attacker to forge a packet to obtain a particular hash, there is no requirement to generate static hashes, and in alternative examples a rolling hash for a particular packet may correspond to a combination of the packet in combination with the rolling hash of the preceding packet.

It will be appreciated that a rolling hash for a particular packet corresponds to a combination of the packet or static hash thereof and the rolling hash from the preceding packet. Furthermore, the rolling hashes in the progression may also be dependent on the value of the secret data 29 or other suitable data. Combining the static hash, the packet, one or more rolling hashes, the secret data 29 and/or any other data may involve concatenation, whereby the next rolling hash for a progression may be generated by a suitable transformation function of the resulting concatenation.

On generating forward rolling hashes 28 for each of the packets 22, the message 20 may be transmitted from the servers 12/14 to the IoT devices 1 (as shown in FIG. 2).

In some examples, the forward rolling hashes 28 may be included as check values in hash data 34 in the manifest 30 (shown in FIG. 3d). The static hashes 26 ($S_1$-$S_n$) may also be included as check values in the hash data 34.

The manifest 30 may optionally be signed by the transmitting device using appropriate key material, to provide a verifiable signature 32 to demonstrate authenticity of the source of the manifest 30. It will be appreciated that the receiving device may comprise corresponding key material to verify the signature. As above, such key material may include symmetric or asymmetric cryptographic key pairs.

The manifest 30 may also include other data relating to the message such as function data 31 to inform a receiving device as to which transformation function and/or which protocol should be used to generate the static and/or rolling hashes (e.g. SHA256, MD5, CRC8) etc. Furthermore, when secret data is used to generate the forward rolling hashes, a secret protocol data 35 may be included in the manifest 30 from which the receiving device can derive the secret data. The secret protocol data 35 may also provide details of an appropriate operation by which the receiving device is required to use the secret data in order to generate the correct check values.

The secret protocol data 35 may be encrypted by the transmitting device, for example, using appropriate key material (e.g. a public key of the receiving device or a symmetric key), whereby the key material may be provisioned on the transmitting device and receiving devices, for example, at manufacture or during a pairing operation between the devices.

The manifest may also comprise data relating to resources from which IoT devices should accept messages/packets, or from which the IoT device should re-request messages from when appropriate. Therefore, the manifest may inform the IoT device as to different sources for the message, should a transmitting device become compromised.

The manifest 30 may be transmitted as a discrete communication, separate from the associated message e.g. using a different communications channel, or using a different communications protocol. Additionally or alternatively, the manifest may be transmitted as part of the associated message, for example whereby it is concatenated to the message. Alternatively, the manifest may be transmitted before or after the associated message.

On receiving the message and the manifest, the receiving device can generate static and rolling hashes using the hash functions detailed in the manifest, and use the results as check values.

In some cases, if the size of the message is too large to be transmitted in a single communication, it may be split into smaller message portions, each message portion comprising one or more packets.

As the manifest 30 provides forward rolling hash values for each of the individual packets in the message, there is no requirement for the receiving device to await receipt of the entire message, and the receiving device can begin to generate rolling hashes once the manifest 30 and a first portion of the message is received thereat.

Therefore, if an issue with data integrity is identified in a packet before the entire message is received, there is no requirement for the receiving device to wait for the entire message and can begin to verify the integrity of the data in the packets already received thereat. Furthermore, as receiving devices may identify errors in data integrity at different times before the entire message is received, the receiving devices may re-request transmission of packets from the transmitting device or other resource at different times. Such functionality may reduce the processing burden on transmitting device/other resources, and may also reduce the burden on the network, as the re-requests may not be generated and transmitted from receiving devices at substantially the same time.

It will be appreciated that the size of the manifest 30 may be proportional to the size of the check values in the hash data 34. For example, if each of the check values comprises 256-bit rolling hashes, then for a message having 20 packets, the corresponding manifest will comprise at least 5120-bits (not including check values of static hash, or any other data therein). As above, IoT devices tend to have limited processing power and memory capacity, and, while such check values may provide for increased security against forgery, relatively large messages or manifests may be unsuitable for IoT devices.

Therefore, it may be beneficial to reduce the size of the hash data 34 included in the manifests.

One technique for reducing the size of the hash data 34 included in the manifest may be to extract a sample of bits from the rolling hash, thereby generating extract samples (E) from the respective forward rolling hashes 28. As illustratively shown in FIGS. 3b and 3c, any number of bits may be taken from each of the respective forward rolling hashes 28 and used as extract samples for each packet.

FIG. 3c schematically shows the extract samples from the forward rolling hashes 28 arranged in an array 33, whereby for the first extract sample ($E_{12}$) the first and second bits of the respective rolling hashes 28 are extracted as check values.

Similarly, for the second extract sample ($E_{45}$) the fourth and fifth bits of the respective forward rolling hashes 28 are extracted, while for the third extract sample ($E_{8-11}$) bits 8, 9, 10 and 11 of the respective forward rolling hashes 28 are extracted as check values. The extract samples may be included in the hash data 34 as check values. Furthermore, data identifying the bits of the rolling hash data used to provide the extract samples may also be included in manifest, for example as part of the hash data 34.

The hash data 34 comprising extract samples (E) of the respective rolling hashes as check values, or an array thereof, is reduced in size in comparison to hash data comprising full rolling hashes as check values. Therefore, the corresponding manifest will also be reduced in size.

As an illustrative example, for a message having 20 packets, and taking extract samples (E) of 2-bits per rolling hash as check values for each packet, the corresponding manifest will comprise at least 40-bits for check values (not including check values of static hash, or any other data therein (e.g. data identifying the bits)). In alternative examples, the extract samples may also include extracted samples from the packets, the static hashes and/or secret data.

As above, the rolling hashes and/or extract samples (E) may be used as check values for verifying the integrity of the data.

Furthermore, combining the static hash and the extract samples (E) as check values may also provide for improved verification of data integrity in comparison to using extract samples (E) alone. In an illustrative example, static hashes and extract samples (E) of respective packets of a message are used as 16-bit check values for the respective packets of the message, whereby 14-bits of the check values are provided by the static hash bits and 2-bits of the check values are provided by the extract samples (E) of the rolling hash. In the present illustrative example, there is a 1:16384 (i.e. $2^{14}$) probability that there will be a silent failure in the static hash; combined with a 1:4 (i.e. $2^2$) probability that there will be a silent failure in the rolling hash, thereby providing a 1:65536 (i.e. $2^{16}$) probability of a silent failure for the check value for the first packet. This probability may provide insufficient security for some communication protocols. However, as the check value for the following packet also has a 1:4 ($2^2$) probability of failure if the previous packet has a silent failure, then this provides a combined probability of a silent failure in the first packet of 1:262144 (i.e. $2^{18}$). It will be appreciated that, due to the rolling hash, the probability of silent failure accumulates and increases for each successive packet of a message. A silent failure may include a failure whereby an attacker obtains the correct static hash and/or rolling hash value by forging/guessing the value.

It will be appreciated that a device receiving one or more packets of a message and a manifest comprising hash data having check values relating to the packets allows for the receiving device to undertake verification of data integrity of the one or more packets without having to wait for the entire message to be received. Furthermore, on identifying errors in packets during the data integrity verification, the receiving device may preferentially re-request packets closest to the failure and verify the data integrity of any packets received in response to the re-request. Therefore, as the device is not required to re-request the entire message at once, such functionality may provide for a reduction in the data transmitted across the network.

If errors persist in the re-requested packets the device may, starting with the most recently checked packets, work backwards towards the oldest checked packet, re-requesting packets until an error-free packet is received.

The extract samples may be any suitable number of bits as required for a particular application.

Furthermore, in some examples, the hash functions and/or data identifying the bits of the rolling hash data used to provide the extract samples may not be included in the manifest and the receiving device may be provisioned with standard or pre-set information to allow the receiving device to generate the correct hash functions and/or extract samples for one or more packets. For example, the receiving device and transmitting devices may be synchronized with each other (e.g. by a UNIX clock) such that particular hash function/extract samples will be generated using the standard or pre-set information valid at a particular time.

Figure 4A:
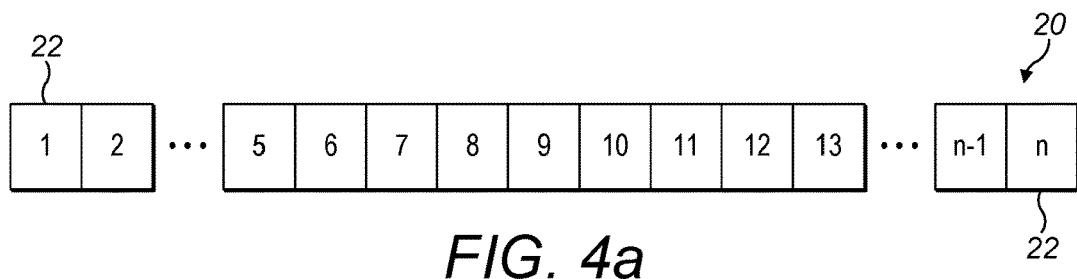
Figure 4B:
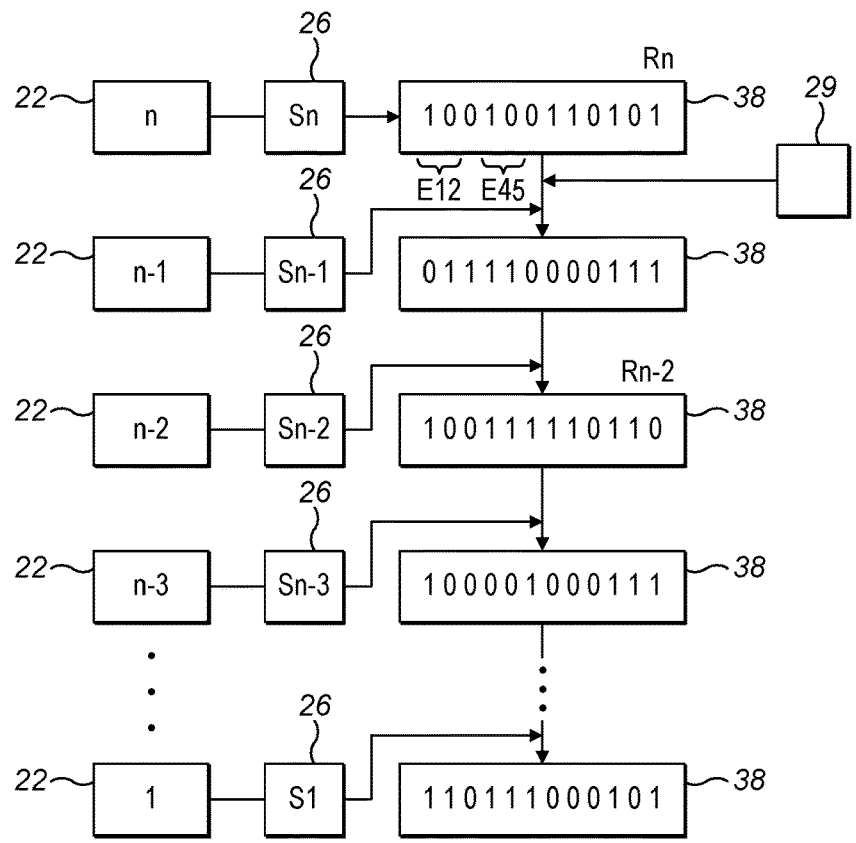
FIG. 4b schematically shows the generation of backward rolling hashes.
Figure 4C:
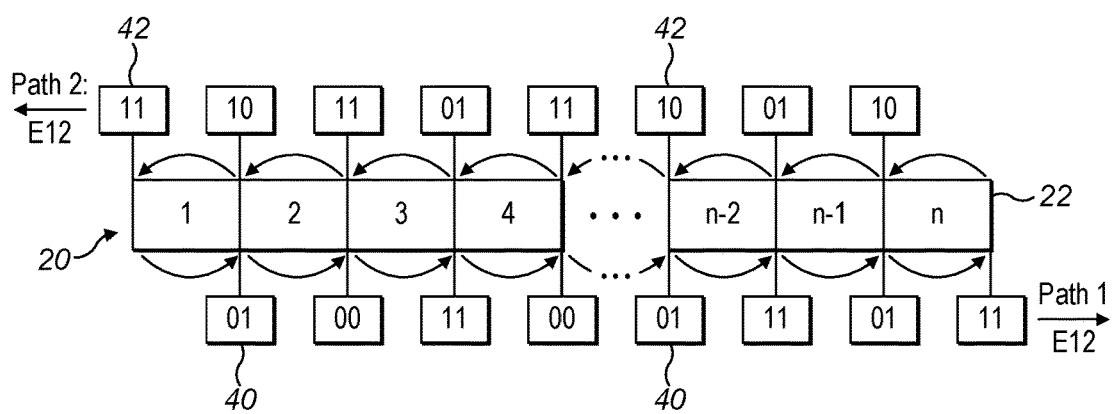
FIG. 4c schematically shows two verification paths.

FIG. 4a schematically shows the message 20 (as also shown in FIG. 3a); FIG. 4b schematically shows the generation of rolling hashes 38 by an appropriate device; while FIG. 4c schematically shows two verification paths/routes hereinafter 'paths.' The two paths in FIG. 4c are depicted as "Path 1" & "Path 2" respectively. Like numbering used above will be used as appropriate.

FIG. 4b describes the generation of rolling hashes 38, e.g. by one or more of the servers 12/14 or IoT devices 1 of FIG. 2, whereby the rolling hashes 38, or extracts therefrom, may be used as check values for the purpose of verifying the integrity of the data in messages exchanged therebetween.

In the present example, each packet 22 of the message 20 is transformed to generate static hashes 26 as previously described.

As above, a progression of rolling hashes 38 is generated, whereby the value of a particular rolling hash 38 in the progression is dependent on the characteristics of all preceding packets used to generate that particular rolling hash.

In the present example, consecutive packets in the notional backward direction from a first packet (Packet n) to a last packet (Packet 1) of the message 20 (hereinafter 'backward consecutive packets') are used to generate the progression of rolling hashes 38, hereinafter 'backward rolling hashes'. It will be appreciated that "first" and "last" are not to taken to be limited to the actual "first" or "last" packets of a message.

As above, secret data 29 may optionally be used to contribute to the backward rolling hashes 38.

In the present example, the first rolling hash ($R_n$) of the backward rolling hashes 38 corresponds to the static hash $S_n$ of the first packet (n). However, as above, in some examples a different transformation function may be used to generate the static hashes and rolling hashes. The second rolling hash ($R_{n-1}$) shown in FIG. 4b corresponds to a combination of static hash ($S_{n-1}$) and rolling hash ($R_n$) and secret data 29; while the third rolling hash ($R_{n-2}$) corresponds to a combination of the static hash ($S_{n-2}$) and rolling hash ($R_{n-1}$). Similarly, the final rolling hash ($R_1$), corresponds to a combination of the static hash ($S_1$) and rolling hash ($R_2$). In some examples, the final rolling hash ($R_1$) of the backward rolling hashes 38 corresponds to the hash of the entire message 20.

As above, the individual backward rolling hashes may be included as check values in the hash data 34. Additionally or alternatively, extract samples (E) of the respective backward rolling hashes ($R_n$-$R_1$) may be extracted and included as check values in the hash data.

On generating backward rolling hashes $R_n$-$R_1$ for each of the packets 22, the message 20 may be transmitted from the servers to the IoT devices (as shown in FIG. 2), whereby the receiving devices may generate check values corresponding to those of the backward rolling hashes for verification of the data integrity of the message.

While the examples described above generally describe using forward rolling hashes or backward rolling hashes to verify the integrity of data in a message, the following examples describe using both forward and backward rolling hashes (or extract samples therefrom) to verify the integrity of data in a message.

FIG. 4c, schematically shows two verification paths or routes for the message 20, whereby a path or route, hereinafter 'path', is taken to comprise one or more consecutive groups of a message, while a group comprises one or more consecutive packets. A stride is taken to be the number of packets in a group. There is no requirement that the groups along a particular path have the same stride. Furthermore, the check value for a group (e.g. rolling hash (or extract sample), static hash) of a particular group is taken to be the check value generated for the final packet of that particular group.

In the illustrative example of FIG. 4c, a first path, depicted as 'Path 1', comprises consecutive groups of consecutive packets 22 of the message 20 notionally in the forward direction of the message 20 from Packet 1 to Packet n, hereinafter 'forward consecutive packets'. Each group in Path 1 comprises a stride of one packet.

Furthermore, a second path, depicted as 'Path 2', comprises consecutive groups of packets 22 of message 20 in the notional backward direction of the message 20 from Packet n to Packet 1, hereinafter 'backward consecutive packets'. Each group in Path 2 also comprises a stride of one packet. As described above, each of the forward and backward consecutive packets have respective check values.

In the illustrative example of FIG. 4c, extract samples 40 are taken from the rolling hashes of the packets 22 in the groups along Path 1, while extract samples 42 are taken from the rolling hashes of the packets 22 in the groups along Path 2. Such extract samples may then be used as check values and included within hash data in a manifest associated with the message 20.

On receiving the message and associated manifest, a receiving device may generate forward and backward rolling hashes for each packet of the message and take extract samples as check values for the respective groups identified in the manifest. The receiving device may then compare the check values which it generated, with those specified in the hash data in the manifest.

It will be appreciated that for the present example, while an attacker may successfully forge packets for groups in Path 1 by making a 2-bit guess for each successive 2-bit extract sample, forging packets for groups in Path 2 may be more difficult to achieve because extract samples for Path 1 and Path 2 may be generated and checked substantially simultaneously by a receiving device, and so an attacker would be required to forge the packets in both paths at substantially the same time.

Additionally, while two paths are depicted above, the number of paths is not restricted to two, and any suitable number of paths may be used. Furthermore, a path need not follow a geometric progression of groups, and a path could follow a pseudo-random progression of groups. Furthermore still, all paths do not need to intersect every packet, so long as each packet is intersected by at least one path.

Figure 5A:
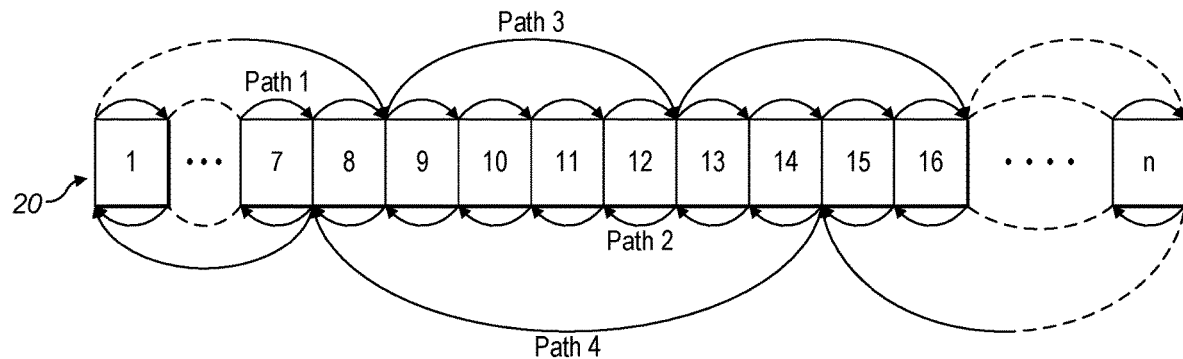
Figure 5B:
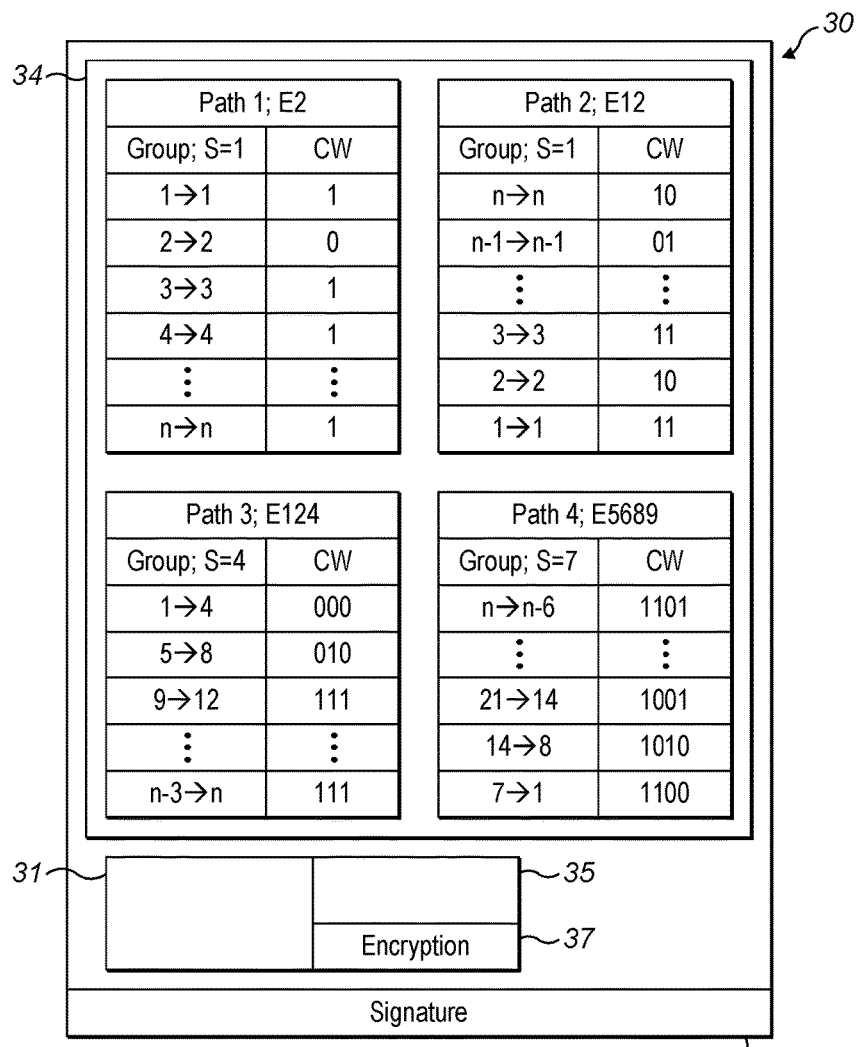
FIG. 5b schematically shows the data manifest of FIG. 3d in greater detail.

As schematically shown in the illustrative example of FIG. 5a, four paths (Paths 1-4) are depicted for message 20; while FIG. 5b schematically shows the manifest 30 for message 20, whereby the manifest 30 includes hash data 34 for the associated message 20. Like numbering used above will be used as appropriate.

In the illustrative example of FIG. 5a, a first path 'Path 1' comprises groups having a stride of one packet, whereby consecutive groups comprise forward consecutive packets of the message 20, from Packet 1 to Packet n; while a second path 'Path 2' comprises groups having a stride of one packet, whereby consecutive groups comprise backward consecutive packets, from Packet n to Packet 1.

Furthermore, a third path 'Path 3' comprises groups having a stride of four packets, whereby consecutive groups each comprise forward consecutive packets; while a fourth path 'Path 4' comprises groups having a stride of seven packets, whereby consecutive groups each comprise backward consecutive packets.

It will be appreciated that a receiving device may obtain portions of the message 20 from different resources. Furthermore, the receiving device may randomly or pseudo-randomly fetch packets of the different groups from different devices. As such, by providing different paths it may be difficult for an attacker intercepting such packets to identify which packets the receiving device has previously obtained, and therefore, to forge such packets.

Furthermore, providing two or more paths in the same direction (e.g. forward/backward) enables a receiving device to undertake data integrity verification earlier and identify errors in packets earlier than in comparison to providing one or zero paths in the same direction.

Taking FIG. 5a as an illustrative example, if the receiving device receives packets 1-11 of message 20, the receiving device may generate check values for all groups along Path 1 (from packet 1 (Path 1; Group 1) up to and including packet 11 (Path 1; Group 11)). Furthermore, the receiving device may generate check values for the first two groups along Path 3, i.e. those groups comprising packets 1-4 (Path 3; Group 1) & packets 5-8 (Path 3; Group 2) respectively.

Furthermore, as the rolling hashes are cumulative for paths in the same direction, if data integrity is not compromised then the check values for Path 1; Groups 4 and 8 respectively should correspond to the check values for Path 3, Groups 1 and 2 respectively. If the check values do not correspond, then one or more of the packets in those groups may comprise an error. The receiving device may then re-request the packets of the groups comprising the error. In some examples, the receiving device may re-request packets from one or more different resources from which it originally received the packets, and by doing so may identify an attacker, e.g. by process of elimination.

However, it will be seen that that the receiving device cannot generate check values for any further groups along either Path 1 or Path 3 until at least packet 12 is received. Furthermore, the receiving device cannot generate check values for any group along Path 2 until it receives packet n at least, or for any group along Path 4, until it receives packets n to n−6 at least.

FIG. 5b schematically shows a manifest 30 for associated message 20, whereby, in the present illustrative example, the manifest 30 comprises hash data 34 relating to the different paths (Paths 1-4) of message 20.

In the present illustrative example, the hash data 34 comprises details as to the specific configurations of the paths (Paths 1-4), groups, strides and/or check values for the respective packets therein which can be derived by the receiving device.

For Path 1, the groups are each shown to comprise consecutive packets from 1 to n, whereby the stride (S) is 1; while the extract samples (E) are taken to be a 1-bit value ($E_2$). A check value (CW) array for Path 1 is also provided. In the present example, the CW array comprises the expected values for the extract samples of the rolling hashes of the respective packets of the message as generated by the receiving device.

Similarly, for Path 2, the groups are each shown to comprise consecutive packets from n to 1, whereby the stride (S) between consecutive groups is 1 packet; while the extract samples (E) are taken to comprise 2-bits ($E_{12}$). A CW array for Path 2 is also provided.

For Path 3, the groups are each shown to comprise four packets, whereby the stride (S) between consecutive groups is 4 packets; while the extract samples (E) are shown to comprise 3-bits ($E_{124}$). A (CW) array for path 3 is also provided.

Finally, for Path 4, the groups are each shown to comprise seven packets, whereby the stride (S) between consecutive groups is 7 packets; while the extract samples (E) are shown to comprise 4-bits ($E_{5689}$). A CW array for path 4 is also provided.

While depicted as an array of tables in FIG. 5b, the hash data 34 may be arranged in any suitable format such that it is may be processed by a receiving device. For example, the hash data 34 may be provided as plaintext in the manifest, or as code in a language which the receiving device can interpret.

In some examples, the hash data 34 may comprise an identifier from which the receiving device can determine the specific configurations of the paths, groups, and/or strides for the respective packets, using, for example, standard or pre-set information provisioned thereon. For example the hash data 34 may comprise a counter or UNIX value to indicate which standard or pre-set specific configurations should be used by the receiving device.

As above, the manifest 30 may also comprise function data 31 and may further comprise secret protocol data 35 when secret data is used to generate to the rolling hashes. Furthermore, the manifest may be cryptographically signed by the transmitting device to provide a verifiable signature 32 thereof.

As above, the manifest 30 may also comprise data relating to resources from which IoT devices should accept messages/packets, or location identifiers (e.g. IP addresses) from which the IoT device should re-request messages from when appropriate.

As above, the secret protocol data 35 may be encrypted by the transmitting device, for example, using appropriate key material (e.g. a public key or a symmetric key). Using such functionality, the manifest 30 could be transmitted in plain view, but whereby the manifest 30 may comprise the encrypted secret protocol data 35. If an attacker did obtain/intercept the manifest, the attacker would not be capable of decrypting the secret protocol data 35 (unless it also obtained the appropriate key material), and therefore would not be capable of deriving the secret data required to generate the correct rolling hashes or the correct extract samples.

Using such encryption techniques, the message and the associated manifest could both be sent to a receiving device via an insecure channel, thereby reducing any energy or processing overhead associated with providing a secure channel e.g. SSL. An attacker intercepting the message or manifest would not be capable of decrypting the secret protocol data, and, therefore, would not be capable of deriving the secret data required to generate check values corresponding to those in the manifest. As such, any packets received from such an attacker would be unlikely to generate all check values corresponding to those in the associated manifest, and such packets would result in the failure of any data integrity check.

While in FIGS. 3b and 4b the first rolling hashes R1 are depicted as corresponding to the static hash (51) of the first packet, in some examples a nonce may be used as the first rolling hash R1. By using R1 as a nonce, messages having shared packets at the beginning thereof will result in different rolling hashes along the progression of hashes. Therefore, the progression of rolling hashes will be different notwithstanding the shared packets. Such functionality may be useful for different messages comprising shared packets, e.g. a message comprising a firmware image including a common bootloader.

Furthermore, such a nonce may be transmitted in plaintext, publicly visible in the manifest because a 3$^{rd}$ party accessing the manifest and identifying the nonce will not be able to generate the rolling hashes as the 3$^{rd}$ party won't have access to the other data in the manifest required to generate the progression of rolling hashes.

Furthermore still, in some examples the rolling hashes may be generated using HMAC combined with key material derived from an encryption key (e.g. firmware encryption key) or similar. The key material may be included in the manifest to allow a receiving device generate the rolling hashes. Using such functionality, a potential attacker may not predict the outcome of a modification of a packet, and therefore, the difficulty in modifying one or more packets is increased.

Figure 6:
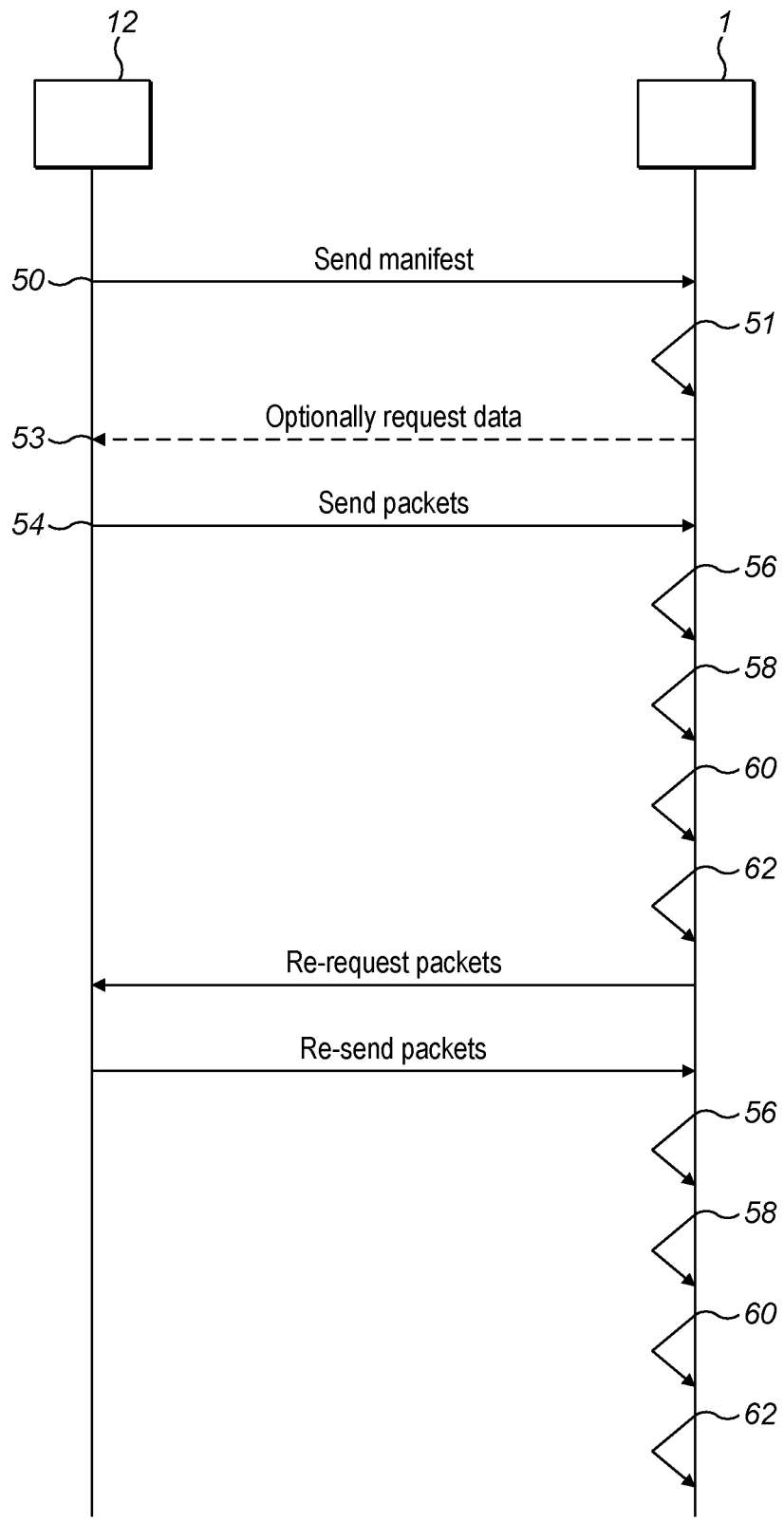
FIG. 6 schematically shows an interaction between a transmitting device and a receiving device.

FIG. 6 schematically shows an example interaction between a transmitting device, depicted as a server 12, and a receiving device, depicted as an IoT device 1. It will be appreciated that the transmitting device may be any suitable resource, while the receiving device may be any suitable resource or device capable of processing data.

In FIG. 6, the server 12 transmits 50 a manifest to the IoT device 1. As above, the manifest may comprise information such as hash data, secret protocol data or function data. The IoT device 1 may then process 51 the manifest, whereby it may, for example, derive paths, groups, strides, check values and/or transformation functions from the information therein. The IoT device 1 may verify any signature(s) associated with the manifest to determine the authenticity of the transmitting device, and/or decrypt any encrypted data e.g. secret protocol data to derive secret data required to generate rolling hashes.

The server 12 then transmits 54 one or more packets of a message associated with the manifest to the receiving device 1. The transmission 54 may occur in response to a request 53 for packets from the IoT device 1. However, in Peer-to-Peer communications involving pluralities of IoT devices, such requests may be numerous so requests from IoT devices may be minimized. Therefore, the transmission 50 may occur a defined period of time after transmitting the manifest, without receiving a request.

On receiving the packets, the IoT device 1 may generate 56 rolling hashes and extract samples to derive check values for each of the groups using the information provided in the manifest or from standard or pre-set information as may be provisioned on the IoT device 1.

Furthermore, the device may undertake a verification of data integrity 60 by comparing the generated check values for the groups with those defined in the manifest along one or more of the paths.

If no errors are identified for the packets received, the IoT device 1 may, if the entire message is not yet received, request further packets 53 or await such further packets from the server 12 or other resource. On receiving such packets, the IoT device 1 may repeat steps 56-60 until the entire message is received and the data integrity thereof verified. The IoT device may then process the entire message. For example, if the message is a firmware update then the IoT device may write overwrite the existing firmware thereon.

However, if the data integrity cannot be verified (e.g. where check values of the groups do not match), the IoT device 1 may transmit 62 a re-request for packet(s) of one or more groups identified as having an error. On receiving the packet(s), the IoT device may repeat steps 56-60 as above.

Additionally or alternatively the IoT device 1 may transmit 62 the re-request to a different resource other than the server 12 from which it received the original packets. A re-request to a different resource may occur, for example, if the IoT device 1 consistently receives packets having errors from a particular resource, or if the number of errors in packets received from a particular resource is greater than a threshold. Additionally or alternatively, the IoT device 1 may issue a warning message to a trusted resource that rogue packets are being received in packets received from a certain resource.

In alternative examples, the manifest may be transmitted 50 after all packets are transmitted by the receiving device, or during/in-between transmission of the packets.

Furthermore, in some examples, the IoT device may not accept packets from a source unless it firsts receives a manifest. In further examples the IoT device may not accept packets from a source unless the source signs the manifest (e.g. signed with a private key, or using HMAC with key material (e.g. a cryptographic key shared with the IoT device).

Figure 7A:
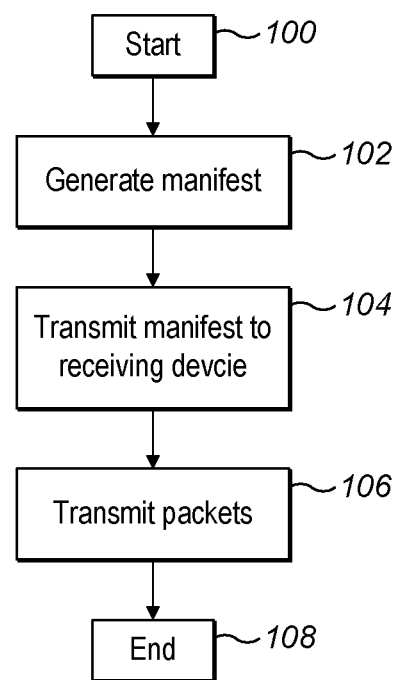
FIG. 7a schematically shows an example method of a transmitting device generating and transmitting a data manifest and an associated message to one or more receiving devices.
Figure 7B:
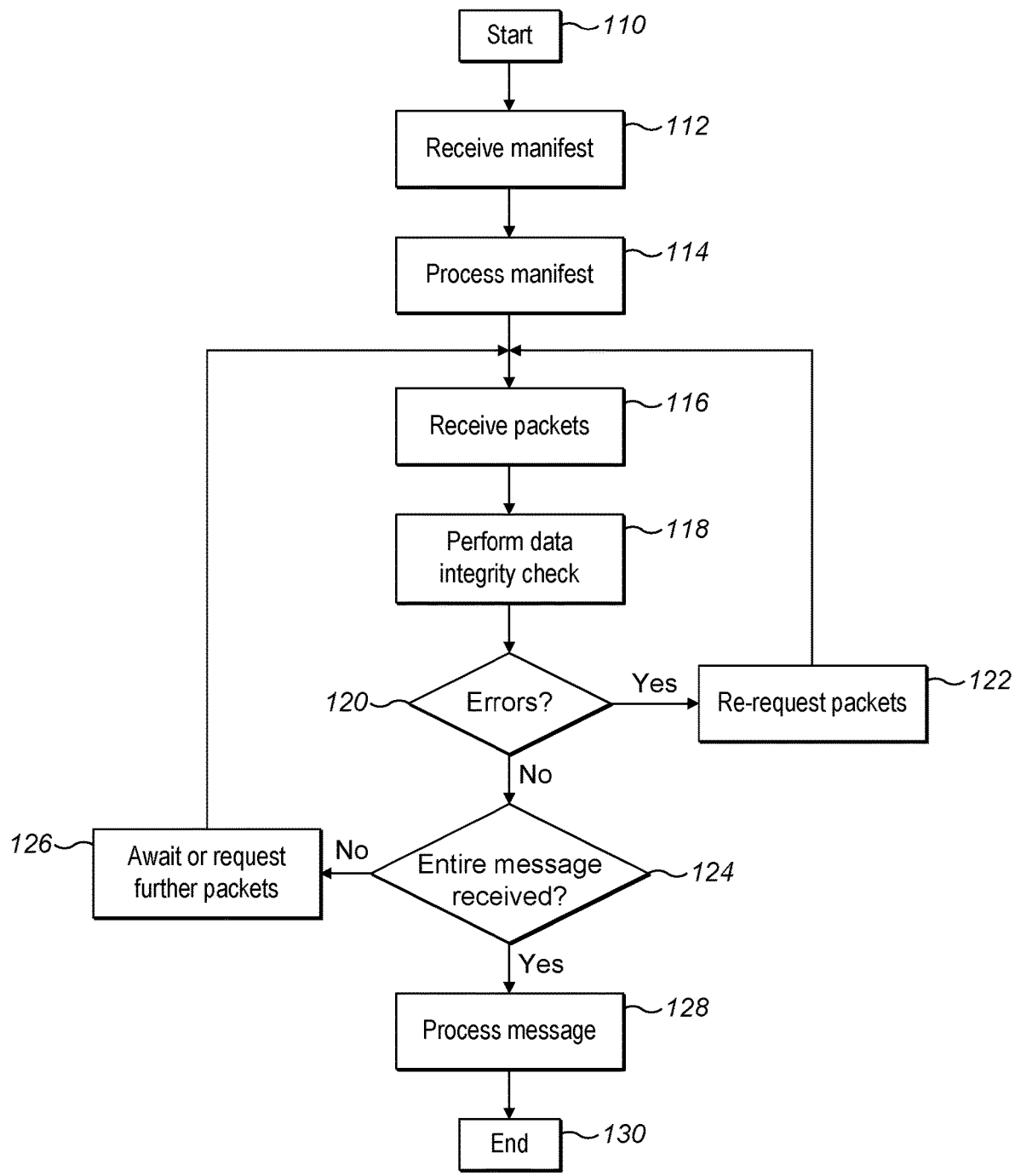
FIG. 7b schematically shows an example method of a receiving device processing the data manifest and verifying data integrity for the packets of the message.

FIG. 7a schematically shows an example method of a transmitting device generating and transmitting a manifest and an associated message to a receiving device, while FIG. 7b schematically shows an example method of a receiving device processing the manifest and verifying data integrity for the packets of the associated message.

At Step 100 the method of FIG. 7a starts.

At Step 102, the transmitting device generates the manifest. As above, the manifest may comprise hash data for the associated message, and may further comprise function data, secret protocol data and a signature as previously described.

At step 104, the transmitting device transmits the manifest to the receiving device, and at step 106 the transmitting device transmits packets of the associated message to the receiving device. Such a transmission may occur as a broadcast transmission, and may be received by a plurality of devices. It will be appreciated that the entire message may be sent as a single message, or as two or more smaller portions. Such functionality may be used when the payload in the packets is too large to be sent within a single message. Furthermore, the order of transmission of the manifest and associated message may vary. For example, the manifest may be transmitted before or after the associated message. In some examples, the manifest may transmitted at substantially the same time as the message (e.g. as part of the same communication).

At step 108, the method of FIG. 7a completes.

At step 110, the method of FIG. 7b starts.

At step 112, the receiving device receives the manifest transmitted at step 104 of FIG. 7a, and at step 114, the receiving device processes the manifest and derives, for example: hash data relating to the groups/paths/extract samples etc. Furthermore, the receiving device identifies the transformation function required to generate static and/or forward/backward rolling hashes; verifies the signature of the manifest (if a signature is present); and/or derives secret data to generate rolling hashes (if secret protocol data is present).

At step 116, the receiving device receives the packets of the message associated with the manifest, and at step 118 the receiving device verifies the data integrity of all received packets. Such functionality enables the receiving device to identify errors in the packets before the entire message is received.

For example, the receiving device may receive the first 64 packets of a 128 packet message. As such, the receiving device may generate static hashes, forward rolling hashes and extract samples for each of the 64 packets received, and may generate check values for different groups thereof, and along different paths. As such, the receiving device can then verify the integrity of the data in such groups using the check values generated thereby and the check values of the hash data of the manifest.

In some examples, the order by which the receiving device receives the manifest and message is varied, whereby, for example, the receiving device receives the message (or a portion thereof) before receiving the manifest. In some examples, the manifest and message may be received at substantially the same time (e.g. as part of the same communication).

At step 120, if errors are identified during the verification of data integrity, then at step 122 the receiving device may re-request one or more packets from the transmitting device, or from another resource, and repeat steps 116-120.

At step 120, if no errors are identified during the verification of data integrity, then at step 124 the receiving device may determine whether or not all the packets of the message are received. At step 126, if the receiving device determines that further packets are required, then the receiving device may request the further packets from the transmitting device or from another resource, perform steps 116 to 124 for any new packets received. If at step 124, the receiving device determines that the entire message to be checked is received, the receiving device may, at step 128, process the message. For example, if the message comprises a firmware update then the receiving device may update the firmware thereon with the update.

At step 130, the process of FIG. 7*b* completes.

Figure 8:
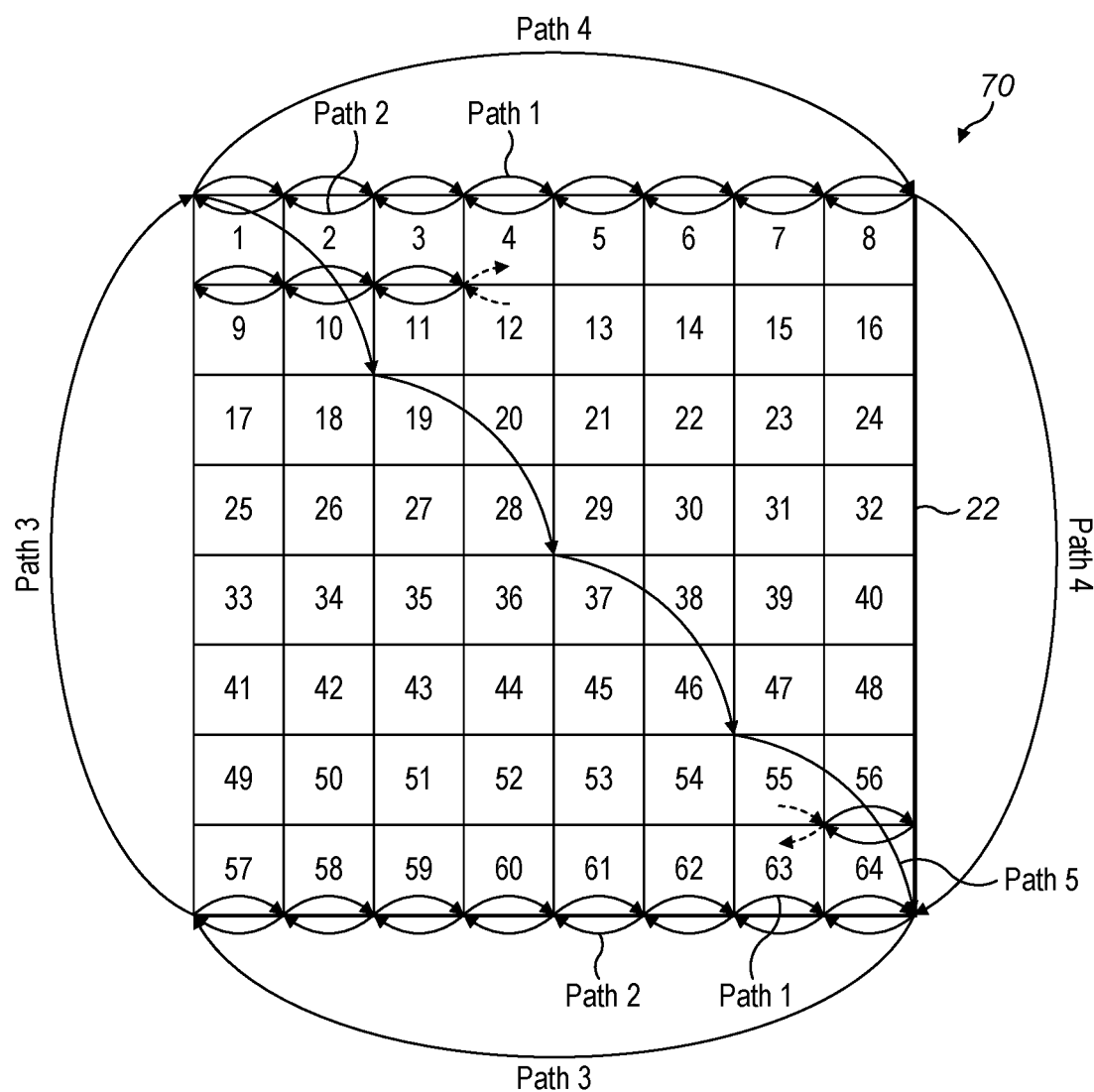
FIG. 8 schematically shows a plurality of packets notionally arranged in a matrix.

FIG. 8 schematically shows a plurality of packets 22, whereby the packets 22 are notionally arranged in a matrix 70. Like numbering used above will be used as appropriate.

The matrix 70 may be defined by one or more different paths, whereby the paths extend in any direction in the matrix. It will be appreciated that while the matrix 70 in FIG. 8 is depicted as a square comprising 64 packets it is possible to organize the packets so they are notionally arranged in any 2-dimensional or 3-dimensional shape having 1-n packets e.g. a rectangular, cubic, pentagonal, rhombic etc.

Furthermore, a path need not follow a geometric progression, and a path could follow a pseudo-random progression. Furthermore still, all paths do not need to intersect every packet, so long as each packet is intersected by at least one path.

By grouping the packets and defining different paths (e.g. Paths 1-5 are depicted in FIG. 8), and providing check values for each group along a particular path, the check values derived from a progression of rolling hashes for respective forward or backward consecutive packets of the matrix, it may be possible to increase the security for messages exchanged between devices e.g. by increasing the number of bits/packets that an attacker has to forge.

Additionally or alternatively, by using extract samples of the rolling hashes it may be possible to reduce the bit size of check values for individual groups in comparison to using, for example, entire rolling hashes as check values.

Furthermore, as above, some paths may improve the ability of the receiving device to detect packets with errors (or forged packets) early.

As above, each of the paths may comprise groups having different strides. For paths 1 and 2, the groups comprise a stride of 1 packet. Paths 3 and 4 comprise 1 group comprising a stride of 8 packets, and a further group comprising 56 packets, while Path 5 comprises a first group having a stride of 10 packets and 3 following groups comprising 18 packets.

In some examples, the packet and/or group size may be dependent on the communication protocol used. For example, for BLE the maximum packet payload is 20-bytes. As such, by setting a packet size to be 20-bytes and, by setting a stride to equal 1, a rolling hash (or extract samples) could be provided for all packets using a particular protocol.

In other examples the packet size, group size and/or stride may be varied such that the rolling hash (extract sample) is provided for all packets of a particular protocol (e.g. BLE/6LoWPan/3 G/4G).

The steps of generating a first progression of rolling hashes, deriving group check values and/or verifying the integrity of the data in message may all be undertaken at the device. Alternatively, these steps may be undertaken at one or more further data processing devices (e.g. a server) in communication with the device.

Furthermore, the device may receive the manifest and the message at the same time. Alternatively, the device may receive the manifest at a different time to that message (e.g. before or after).

The method may further comprise, generating a second progression of rolling hashes for the plurality of packets; deriving group check values from the second progression of rolling hashes for groups of the plurality of packets along one or more paths.

Furthermore, the groups along the first path may be forward consecutive groups, while the groups along the second path may be backward consecutive groups.

A stride of the forward consecutive groups may be equal to a stride of the backward consecutive groups, wherein the stride of the forward consecutive groups may be one packet.

The group check values may comprise extract sample bits of the first or second progressions of rolling hashes, wherein the manifest further comprises data identifying bits of the respective rolling hashes used to provide the extract samples bits and/or wherein respective values of the first or second progression of rolling hashes may be dependent on static hashes of one or more of the plurality of packets.

Respective values of the first or second progression of rolling hashes may be dependent on secret data, wherein the method further comprises: deriving, from secret protocol data in the manifest, the secret data, and wherein the method may further comprise: decrypting, at the device, the secret protocol data.

In some examples, the secret data may comprise: a random number or a cryptographic key.

The method may further comprise: checking a verifiable signature of the second device; verifying the integrity of the data in the message further based on or in response to a determination that the verifiable signature corresponds to an expected signature.

The method may further comprise: transmitting, from the device to the first or different resource, a request for one or more packets of the message based on or in response to a determination that the derived group check values do not correspond to the plurality of group check values in the manifest. The first or the different resources may include one of: a server and a data processing device.

In some examples, the one or more paths may be defined in the manifest or may be standard or pre-set as provisioned on the data processing device.

The steps of generating a progression of rolling hashes; deriving group check values and/or verifying the integrity of the data may all be undertaken at the device. Alternatively, these steps may be undertaken at one or more further data processing devices (e.g. a server) in communication with the device.

The groups along the first and second paths may be forward or backward consecutive groups, wherein a stride of the groups along the first path is different to a stride of groups along the second path, wherein the stride of groups along the first path is one packet.

The group check values may comprise extract sample bits of the progression of rolling hashes, wherein the manifest further comprises data identifying bits of the respective rolling hashes used to provide the extract samples bits.

Respective values of the progression of rolling hashes may be dependent on static hashes of one or more of the plurality of packets and/or secret data.

The method may further comprise: transmitting, from the device to the first or different resources, a request for one or more packets of the portions based on or in response to a determination that the derived group check values do not correspond to the plurality of group check values in the manifest.

The method further may further comprise: generating, at the resource, a second progression of rolling hashes; deriving, at the resource, check values for groups of the plurality of packets from the second progression of rolling hashes along one or more paths.

Transmitting the manifest may comprise broadcasting the manifest to the one or more data processing device, while the method may further comprise: transmitting the associated message to the one or more data processing devices.

In some examples, the first and/or second paths may be defined in the manifest or may be predetermined by the data processing device.

As will be appreciated by one skilled in the art, the present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise subcomponents which may take the form of instructions or sequences of instructions at any of the levels of abstraction, from the direct machine instructions of a native instruction set to high-level compiled or interpreted language constructs.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognize that present techniques have a broad range of applications, and that the embodiments may take a wide range of modifications without departing from the scope of the appended claims.

The invention claimed is:

1. A machine-implemented method for operating a first device to generate verification data for a message, the message having a plurality of packets, the method performed at the first device comprising:
   generating a first progression of rolling hashes for the plurality of packets;
   generating a second progression of rolling hashes for the plurality of packets;
   deriving check values from at least a portion of the first progression for groups of the plurality of packets along a first path comprising forward consecutive packets;
   deriving check values from at least a portion of the second progression for groups of the plurality of packets along a second path comprising backward consecutive packets; and
   generating verification data based on the check values for the groups along the first path and the second path, where the verification data is to enable a second device receiving the verification data to verify the integrity of the data in the message.

2. The method according to claim 1, wherein a stride of the groups along the first path is one packet.

3. The method according to claim 1, wherein a stride of the groups along the second path is two or more packets.

4. The method according to claim 1, wherein the first path and/or the second path comprises a pseudo-random progression of groups.

5. The method according to claim 1, further comprising:
   deriving check values from the second progression of rolling hashes for groups of the plurality of packets along a third path; and
   generating verification data based on the check values derived from the third path.

6. The method according to claim 5, wherein the third path comprises groups of backward consecutive packets.

7. The method according to claim 5, wherein a stride of the groups along the third path comprises one or more packets.

8. The method according to claim 1, wherein the check values comprise extract sample bits of the first or second progressions of rolling hashes.

9. The method according to claim 8, wherein the verification data further comprises data identifying bits of the respective rolling hashes used to provide the extract samples bits.

10. The method according to claim 1, wherein respective values of the first or second progression of rolling hashes are dependent on static hashes of one or more of the plurality of packets.

11. The method according to claim 1, wherein respective values of the first or second progression of rolling hashes are dependent on secret data.

12. The method according to claim 11, wherein the secret data comprises: a random number or a cryptographic key.

13. The method according to claim 11, wherein the verification data further comprises secret protocol data to enable the second device determine the secret data.

14. The method according to claim 1, further comprising:

sending the verification data to the second device in a manifest in a first communication.

15. The method according to claim 14, further comprising:

sending the message to the second device in a second communication.

16. The method according to claim 1, further comprising:

receiving, from the second device, a request to resend a subset of the packets of the message.

17. A first device comprising processor circuitry and communication circuitry, wherein the device is to:

generate a first progression of rolling hashes for the plurality of packets;

generate a second progression of rolling hashes for the plurality of packets;

derive check values from at least a portion of the first progression for groups of the plurality of packets along a first path comprising forward consecutive packets;

derive check values from at least a portion of the second progression for groups of the plurality of packets along a second path comprising backward consecutive packets; and generate verification data based on the check values for the groups along the first path and the second path, wherein the verification data is to enable a second device receiving the verification data to verify the integrity of the data in the message.

18. A computer program product comprising computer-program code tangibly stored on a non-transitory, computer-readable medium, the computer program code executable by a computer system to perform the method of claim 1.

* * * * *